O. F. PETERSON.
JAR HOLDER.
APPLICATION FILED JULY 2, 1910.
981,469.
Patented Jan. 10, 1911.
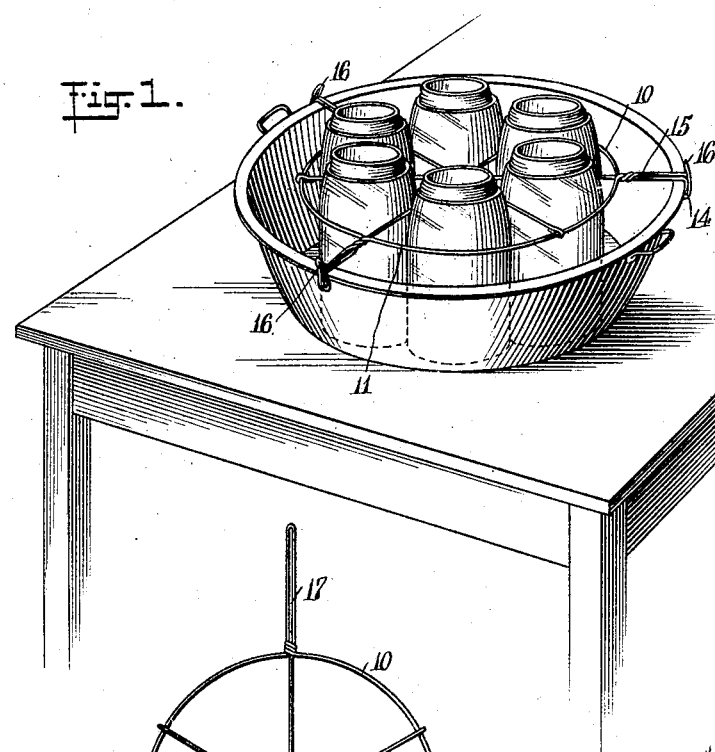
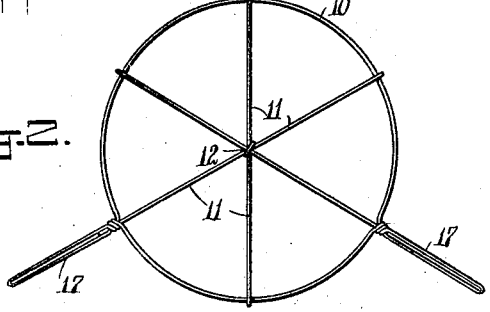
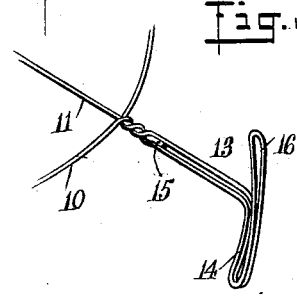
WITNESSES:
INVENTOR
Oscar F. Peterson
BY
ATTORNEYS

UNITED STATES PATENT OFFICE.

OSCAR F. PETERSON, OF KEOKUK, IOWA.

JAR-HOLDER.

981,469.

Specification of Letters Patent. Patented Jan. 10, 1911.

Application filed July 2, 1910. Serial No. 570,116.

*To all whom it may concern:*

Be it known that I, OSCAR F. PETERSON, a citizen of the United States, and a resident of Keokuk, in the county of Lee and State of Iowa, have invented a new and Improved Jar-Holder, of which the following is a full, clear, and exact description.

An object of the invention is to provide a jar holder for conveniently and removably holding preserving jars and the like.

To accomplish the object mentioned, use is made of a frame having diametrically-extending arms bound together at their central crossing and terminating in fasteners for securing the holder, the space between the said arms being adapted to receive preserving jars.

Reference is to be had to the accompanying drawings constituting a part of this specification, in which similar characters of reference denote corresponding parts in all the views, and in which—

Figure 1 is a perspective view of my invention and showing the same as applied; Fig. 2 is a plan view of my device with the fastening members extended, and showing the desired form of the article for commercial use; Fig. 3 is a perspective view of one of the fastening means; and Fig. 4 is a perspective view of two receptacles, one placed on another, with my device therebetween and secured to hold the lower and upper receptacles together.

Referring more particularly to the drawings, I provide a circular frame 10 provided with a series of diametrically-extending arms 11 secured to the frame 10 and preferably bound together at their common central crossing 12. The frame 10 is made of one piece of material and has extended fastening members 13, consisting of grips 14 and a shank 15 with a lip 16 projecting from the grip. The arms 11 are hooked to the frame 10 on one side and terminate in the shank 15, as will be easily seen by referring to Fig. 3. The material for my device is preferably made of a spring wire of a fairly heavy grade and thus the grips 14 become spring-controlled, that is, a tension must be exerted on the grip to slip the same over a receptacle, as shown in Fig. 1. The space interminate the arms 11 receives the jars, as will also be seen in Fig. 1, and the jars are thus prevented from falling over, while at the same time, they can be quickly removed from the jar holder.

When the jars are to be completely covered, as shown in Fig. 4, the grip 14 grips the lower receptacle and the lip 16 is adapted to grip the upper receptacle, to hold the said receptacles together and also securely hold the holder.

The fasteners of my device can also be modified in several ways, as will be seen in Fig. 2. The extensions 17 are purposely permitted to extend, as shown, and when the device is to be secured to a vessel or the like, the extensions 17 can be quickly bent and a safer and more easily-adjustable grip is secured, thus permitting the intending purchaser to easily and quickly adjust the fasteners to fit vessels of various shapes and sizes.

Having thus described my invention, I claim as new and desire to secure by Letters Patent:

A jar holder comprising a circular frame having equidistantly spaced twisted portions extending outwardly a distance beyond the peripheral surface of the frame and terminating in fastening members, and straight arms having one end thereof secured to the frame and the other end terminating in the twisted members, the said bars being connected at their central crossing and extending diametrically across the frame.

In testimony whereof I have signed my name to this specification in the presence of two subscribing witnesses.

OSCAR F. PETERSON.

Witnesses:
F. O. ADAMSON,
GEO. SCHELL.